United States Patent [19]
Kasztreiner et al.

[11] 3,758,546
[45] Sept. 11, 1973

[54] METHOXY AMINE DERIVATIVES AND PROCESS FOR PREPARING THEM
[75] Inventors: Endre Kasztreiner; Laszlo Vargha; Zsuzsanna Huszti; Jozsef Borsi; Geza Szilagyi; Judit Szakaly; Sandor Elek; Istvan Polgari, all of Budapest, Hungary
[73] Assignee: Gyogyszerkutato Intezet, Budapest, Hungary
[22] Filed: June 3, 1971
[21] Appl. No.: 149,789

[30] Foreign Application Priority Data
Dec. 14, 1970 Hungary .............................. GO1152

[52] U.S. Cl........... 260/471 R, 260/326 A, 424/309
[51] Int. Cl........................................... C07c 101/42
[58] Field of Search ................................ 260/471 R

[56] References Cited
UNITED STATES PATENTS
3,410,891  11/1968  Hughes et al................... 260/471 A Primary Examiner—Lorraine A. Weinberger
Assistant Examiner—L. Arnold Thaxton
Attorney—Young & Thompson

[57] ABSTRACT
New substituted methoxy amines of the general formula I

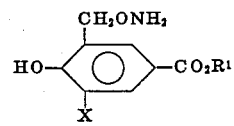

(I)

wherein $R^1$ stands for a methyl or ethyl group, and X is a hydrogen atom or an OH group, and their pharmaceutically acceptable acid addition salts.

The new compounds considerably inhibit the specific (histidine-) and non-specific (DOPA-) decarboxylase and have a low toxicity.

4 Claims, No Drawings

METHOXY AMINE DERIVATIVES AND PROCESS FOR PREPARING THEM

This invention relates to new methoxy amine derivatives and to process for making them.

The remarkable effects produced by histamine, serotonine, dopamine (and nor-adrenaline) in biological and anatomical processes are widely known. The formation of histamine in living organisms is a function of the specific decarboxylase (histidine-decarboxylase), whereas the formation of serotonine, dopamine (and nor-adrenaline) is a function of the so-called non-specific decarboxylase (DOPA-decarboxylase) enzyme function (S. E. Rapoport: Medizinische Biochemie, 3$^{rd}$ Ed. pp. 465,718 and 762 /1965/). Certain substituted benzyloxyamines inhibit the function of both the specific and non-specific decarboxylase enzymes (E. L. Schumann et al., J. Med. Chem. 7, 326 /1964/). One of the active substances of the group is the 3-hydroxy-4-bromo-benzyloxyamine (R. J. Levine et al., Biochem. Pharmacol. 14, 139 /1965/).

The conventional method for preparing benzyloxyamines consists in reacting a hydroxyl amine derivative having a protective group on the nitrogen atom (benzohydroxamic acid, N-hydroxy-urethane, N-hydroxyphthalimide) with a substituted benzylhalide, whereafter the protective group is split off (A. O. Ilvespaa and A. Marxer, Chimia 18, 1 /1964/).

It has been found that methoxy amines containing as substituent a benzene ring substituted with a hydroxyl and a carboalkoxy group considerably inhibit the specific (histidine-) and non-specific (DOPA-) decarboxylase. The toxicity of the compounds is low, a fact which is very important from the point of view of their therapeutic use.

The invention relates to pharmacologically useful new methoxy amine derivatives of the general formula I

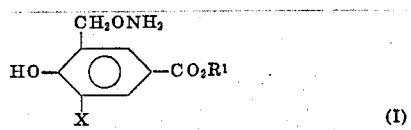

(I)

wherein $R^1$ stands for a methyl or an ethyl group, and X stands for a hydrogen atom or an OH-group, and their pharmaceutically acceptable salts.

In the compounds of the general formula I $R^1$ preferably stands for a methyl group, whereas X preferably represents a hydrogen atom.

The compounds of the general formula I can be prepared according to the invention by reacting a compound of the general formula II

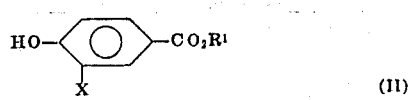

(II)

wherein $R^1$ and X have the meanings stated above, with an acid of the general formula HP, wherein P stands for a chlorine or bromine atom, and with formaldehyde, and reacting the compound so obtained having the general formula III

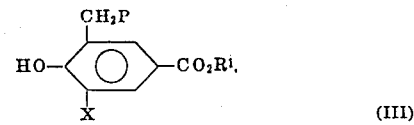

(III)

wherein the meaning of $R^1$, P and X is the same as stated above, with a hydroxyl amine derivative of the general formula $R^2R^3NOH$, wherein $R^2$ stands for a hydrogen atom, whereas $R^3$ represents a carbethoxy group, and $R^2$ and $R^3$ together stand for a phthaloyl, isopropylidene or alpha-hydroxy-benzylidene group, and subjecting the compound so obtained of the general formula IV

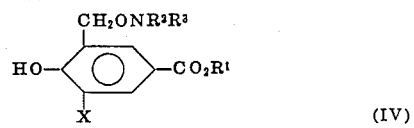

(IV)

wherein the meanings of $R^1$, $R^2$, $R^3$, and X are the same as stated above, to hydrazinolysis, when $R^2$ and $R^3$ together represent a phthaloyl group, and in all other cases to hydrolysis, and, if desired, converting the substituted methoxyamine so obtained into a pharmaceutically acceptable salt.

The compounds of the general formula II are conveniently converted into compounds of the general formula III by suspending the compound in an excess of conc. hydrochloric acid or conc. hydrobromic acid, and after adding thereto paraformaldehyde, heating the mixture to a temperature between 26°C and 60°C. After the reaction is completed, the compounds of the general formula III are separated in crystalline form and can be readily isolated by means of filtration.

The compounds of the general formula III are conveniently converted into compounds of the general formula IV in the following manner. If $R^2$ and $R^3$ together stand for a phthaloyl group, i.e., the compound of the general formula $R^2R^3NOH$ is N-hydroxy-phthalimide, then the halogen compound of the general formula III is reacted with it in the presence of triethyl amine, in dimethyl formamide as solvent, preferably at temperatures ranging from 0° to 80°C. If $R^2$ and $R^3$ stand for an isopropylidene or alpha-hydroxy-benzylidene group, then the compound of the general formula $R^2R^3NOH$ is an acetoxime or benzhydroxamic acid, which is reacted preferably in the presence of a basic substance, for example of sodium alcoholate, with a compound of the general formula III, preferably using the corresponding alcohol as solvent. The most convenient temperature of the reaction is the boiling point of the solvent.

If $R^2$ stands for a hydrogen atom, and $R^3$ for a carbethoxy group, i.e., the compound of the general formula $R^2R^3NOH$ is N-hydroxy-urethane, then the halogen compound of the general formula III is reacted with it preferably in the presence of a basic substance, for example of alkali hydroxide, preferably at temperatures in the range of 20° to 100°C. Methanol or ethanol, or their mixture with water, is employed as preferably solvent.

The conversion of the compounds of the general formula IV into compounds of the general formula I is most conveniently carried out as follows. If the meaning of $R^2$ and $R^3$ together is a phthaloyl group, then one can perform a hydrazinolysis, preferably with hydrazine hydrate. The use of methanol or ethanol as solvent in the reaction is advisable. The preferable temperature of the hydrazinolysis is the boiling point of the solvent. If $R^2$ and $R^3$ together stand for an isopropylidene or an alpha-hydroxy-benzylidene group, or a hydrogen atom and a carbethoxy group, then the hydrolysis is carried out preferably in an aqueous methanolic or aqueous ethanolic solution containing hydrochloric acid, with boiling for a few hours' time.

For preparing the salts non-toxic, i.e. pharmaceutically acceptable acids, are used. This group includes hydrochloric, hydrobromic, sulphuric, and phosphoric acids as inorganic acids; p-toluenesulphonic, methane sulphonic, ethane sulphonic, maleic, fumaric, succinic, tartaric, and lactic acids, as organic acids. The salts can be prepared in a manner known per se; if the substituted methoxy amine was obtained by means of the acidic hydrolysis of the compound of the general formula IV, then the solution obtained after the hydrolysis is evaporated, and the residue is recrystallized in order to obtain the salt. If, however, the compound of the general formula I is obtained in the form of a basis, then the basis is dissolved in water or a suitable organic solvent, to which the solution of the acid in a suitable organic solvent or water is added. If the salt does not crystallize, then the solution is evaporated to dryness and the residue is recrystallized from a suitable solvent.

The compounds inhibit, in vitro and in vivo, both specific and non-specific decarboxylase, and accordingly result in a reduction of the histamine, serotonine and dopamine-level. Their effect is felt above all in the histamine level; so for example they produce a 30 to 60 percent reduction in the gastric and pulmonary histamine concentration of the stomach and the lungs. Since histamine represents the mediator substance of various very important physiological processes, and plays a part in the pathomechanism of some human illnesses, the substances apt to inhibit the decarboxylase owing to their histamine-level-reducing effect are of high significance both for physiological research and for therapy.

The histamine-level reducing action of the compounds according to the invention is manifested mainly in their effect inhibiting gastric acid production and inflammations, but their favourable effect is apparent in all cases of histamine-overproduction, such as mastocytoma.

The process according to the invention is further illustrated by the aid of the following Examples:

Example 1

Preparation of 2-hydroxy-5-carbomethoxy-benzyloxyamine

Method No. 1

Step "A"

To a mixture of 15.2 grams (0.1 moles) of 4-hydroxy-benzoic acid methylester and 130 mls. of conc. hydrochloric acid 3.3 grams (0.11 moles) of paraformaldehyde are added at 5°C. The mixture is then stirred for 2.5 hours at 50° to 55°C, allowed to stand overnight, filtered with suction, washed repeatedly with water and dried. Yield: 18.2 grams (91 %) of crude 3-chloromethyl-4-hydroxy-benzoic acid methylester; m.p. after recrystallization from dichloro-ethane: 147° to 149°C.

Step "B"

To a mixture of 19 grams (0.095 moles) of 3-chloromethyl-4-hydroxy-benzoic acid methylester, 50 mls. of dimethyl formamide and 15.5 grams (0.095 moles) of N-hydroxy-phthalimide, 10.1 grams (0.1 moles) of dry triethylamine are added dropwise at a temperature of 5°C during 30 minutes. The mixture is stirred at room temperature for 4 hours, then allowed to stand for 3 days. The precipitate is filtered off with suction, washed thoroughly with water and dried. Yield: 22.8 grams (73.3 %) of N-(2-hydroxy-5-carbomethoxy-benzyloxy)-phthalimide; m.p.: 194°–196°C. When mixing the dimethyl-formamidic mother lye with a 5-fold volume of water, further 1.93 grams (6.2 %) of the same product can be obtained with a melting point of 192° to 193°C.

Step "C"

The mixture of 16.35 grams (0.05 moles) of N-(2-hydroxy-5-carbomethoxy-benzyloxy)-phthalimide, 3.6 grams (0.0525 moles) of 75% hydrazin hydrate and 50 mls. of ethanol are stirred and heated for 2.5 hours. After cooling the precipitate is filtered with suction, washed with a little ethanol, dried, then rubbed with 100 mls. of 4% aqueous hydrochloric acid solution and filtered with suction. The aqueous hydrochloric acid solution is neutralized by means of solid potassium hydrogen carbonate, the precipitate is filtered with suction, washed repeatedly with water and dried. Yield: 10.95 grams (67 %) of 2-hydroxy-5-carbomethoxy-benzyloxamine. After recrystallization from ethanol m.p.: 150.5 to 152°C.

Method No. 2

Step "A"

2.3 grams (0.1 gatoms) of sodium are dissolved in 50 mls. of methanol, 7.3 grams (0.081 moles) of acetoxime are added, the solution is stirred for 10 minutes, then 20.05 grams (0.1 moles) of 3-chloromethyl-4-hydroxy-benzoic acid methylester prepared according to step "A" of Method 1 in Example 1 are added in 15 minutes at temperatures ranging from 25° to 30°C, and the solution is kept boiling for 3 hours. After cooling the precipitate is filtered with suction, the methanolic mother lye is evaporated in vacuo up to a bath temperature of 70°C, the residue of distillation is dissolved in 100 mls. of dichloroethane, and shaken with 3 × 100 mls. of water. The organic phase is separated, dried over ignited sodium carbonate, and the solution obtained after removal of the drying agent is evaporated in vacuo up to a bath temperature of 70°C. The oily residue is crude 0-(2-hydroxy-5-carbomethoxy-benzyl)-acetoxime, weighing 14.46 grams (61 %).

Step "B"

The mixture of 11.85 grams (0.05 moles) of 0-(2-hydroxy-5-carbomethoxy-benzyl)-acetoxime prepared in the previous step, 100 mls. of methanol and 15 mls. of conc. hydrochloric acid are kept boiling for 2 hours, then the solution is evaporated in vacuo up to a bath temperature of 50°C. To the residue 50 mls. of water are added, the solution is filtered, potassium hydrogen carbonate is added till saturation, and the solution is cooled with ice for a few hours. The precipitate is filtered with suction and dried. Yield: 4.33 grams (44 %) of 2-hydroxy-5-carbomethoxy-benzyloxyamine. After recrystallization from ethanol the m.p. is 150° to 151°C.

Method No. 3
Step "A"

13.7 grams (0.1 moles) of benzhydroxamic acid are dissolved in a sodium ethylate solution prepared from 2.3 grams (0.1 gatoms) of sodium and 90 mls. of abs. ethanol, then 20.05 grams (0.1 moles) of 3-chloromethyl-4-hydroxy-benzoic acid methylester prepared according to step "A" of Method No. 1 of Example 1 are added in 15 minutes, and the mixture is kept boiling for 3.5 hours. After cooling the precipitate is filtered with suction, and the solution is evaporated in vacuo up to a bath temperature of 70°C. The glass-like residue so obtained is the crude 0-(2-hydroxy-5-carbomethoxy-benzyl)-benzhydroxamic acid, weighing 20.2 grams (67 %).

Step "B"

The mixture of 15.05 grams (0.05 moles) of 0-(2-hydroxy-5-carbomethoxy-benzyl)-benzhydroxamic acid, 80 mls of methanol and 20 mls of conc. hydrochloric acid is kept boiling for 2 hours, then the solution is evaporated in vacuo up to a bath temperature of 50°C, the residue is mixed with 50 mls. of water and filtered with suction. The solution is shaken with 2 × 10 mls. of ether. Potassium hydrogen carbonate is added to the aqueous phase till saturation, and the solution is ice-cooled for a few hours. The precipitate is filtered with suction and dried. Yield: 4.77 grams (48.5% ) of 2-hydroxy-5-carbomethoxy-benzyloxyamine. M.p. after recrystallization from ethanol 150° to 150.5°C.

Method No. 4
Step "A"

21 grams (0.2 moles) of N-hydroxy-urethane are dissolved in 100 mls. of methanol, then 40.1 grams (0.2 moles) of 3-chloromethyl-4-hydroxy-benzoic acid methylester, prepared according to step "A" of Method No. 1 in Example 1 are admixed. 28 grams (0.2 moles) of 40% aqueous potash lye are added with stirring and cooling by cold water in the course of 15 to 20 minutes, and the mixture is kept boiling for 3 hours. After cooling the mixture is evaporated in vacuo up to a bath temperature of 60°C, and the residue is taken up in a mixture of 100 mls. of water and 200 mls. of chloroform. After separation the organic phase is shaken with 2 × 100 mls. of water, and the organic phase is dried over heated potassium carbonate. The solution obtained after removal of the drying agent is evaporated in vacuo up to a bath temperature of 60°C. A highly viscous oil obtained as residue is the crude N-(2-hydroxy-5-carbomethoxy-benzyloxy)-urethane, weighing 32.82 grams (61%).

Step "B"

The mixture of 26.9 grams (0.1 moles) of N-(2-hydroxy-5-carbomethoxy-benzyloxy)-urethane, 150 mls of methanol and 30 mls. of conc. hydrochloric acid are kept boiling until the evolution of carbon dioxide ceases (about 3.5 hours), then the solution is evaporated in vacuo up to a bath temperature of 70°C. The residue is taken up in 100 mls. of water, and after filtering one proceeds as described in step "B" of method No. 2 in Example 1. Yield: 9.89 grams (50.2%) of 2-hydroxy-5-carbomethoxy-benzyloxyamine. M.p., after recrystallization from ethanol: 150° to 152°C.

Example 2
Preparation of 2-hydroxy-5-carbethoxy-benzyloxyamine
Step "A"

To a mixture of 33.2 grams (0.2 moles) of 4-hydroxy-benzoic acid ethylester and 200 mls. of 48 % hydrobromic acid 6.6 grams (0.22 moles) of paraformaldehyde are added with stirring at a temperature in the range from 10° to 15°C in the course of 30 minutes. The mixture is continued to be stirred at 25°C for 6 hours, then the precipitate is filtered with suction, washed thoroughly with water and dried. The crude product so obtained is twice recrystallized from a mixture of dichloroethane and ethyl acetate, whereupon 28.1 grams (54.1 %) of 3-bromomethyl-4-hydroxy-benzoic acid ethylester are obtained with a m.p. of 144° to 147°C.

Step "B"

10.5 grams (0.1 moles) of N-hydroxy-urethane are dissolved in 100 mls. of methanol, 25.9 grams (0.1 moles) of 3-bromomethyl-4-hydroxy-benzoic acid ethylester prepared in the previous step are added, then a mixture of 5.4 grams (0.1 moles) of sodium methylate and 100 mls. of methanol are added dropwise with stirring and ice-cooling during 15 minutes, then the mixture is kept boiling for 1.5 hours. After cooling one proceeds as in step "A" of Method No. 4 in Example 1. After evaporation of the chloroform, the crude N-(2-hydroxy-5-carbethoxy-benzyloxy)-urethane is obtained in the form of a glass-like mass. Weight: 13.02 grams (46%).

Step "C"

A mixture of 14.15 grams (0.05 moles) of N-(2-hydroxy-5-carbethoxy-benzyloxy)-urethane prepared in the preceding step, 80 mls. of ethanol and 16 moles of conc. hydrochloric acid are kept boiling until the evolution of carbon dioxide ceases (about 3 hours), then the mixture is evaporated in vacuo up to a bath temperature of 70°C. The residue is mixed with 100 mls. of water, filtered with suction, the solution is extracted with 2 × 100 mls. of ether, and the aqueous phase is evaporated to dryness in vacuo up to a bath temperature of 50° to 60°C. Recrystallizing the residue from isopropanol containing water yields 6.85 grams (53.2 %) of 2-hydroxy-5-carbethoxy-benzyloxyamine hydrochloride with a m.p. of 248° to 251°C (with decomposition).

Example 3
Preparation of 2,3-dihydroxy-5-carbomethoxy-benzyloxyamine
Step "A"

A suspension of 38.27 grams (0.228 moles) of 3,4-dihydroxy-benzoic acid methylester, 14.1 grams (0.468 moles) of paraformaldehyde and 152 mls. of conc. hydrochloric acid are stirred with simultaneous introduction of hydrochloric acid gas for 2 hours at temperatures of 12° to 18°C. The suspension is then heated during 30 minutes to 50°C and kept at this temperature for a further 30 minutes with stirring and gas introduction. The precipitate is filtered with suction, washed with a little cold water and dried. 23.0 grams of about 80 % pure 3,4-dihydroxy-5-chloromethyl-benzoic acid methylester are obtained with a melting point of 160° to 166°C.

Step "B"

To a mixture of 18.4 grams (0.085 moles) of 3,4-dihydroxy-5-chloromethyl-benzoic acid methylester (corresponding to 23 grams of a 80 % pure product), 13,9 grams (0.085 moles) of N-hydroxy-phthalimide and 28 mls. of dimethyl formamide a mixture of 8.6 grams (0.085 moles) of triethylamine and 9 mls. of dimethyl formamide are added at 5°C during 30 minutes with stirring. The mixture is stirred for a further 4 hours at room temperature, then it is allowed to stand at room temperature for 4 days, and finally poured into 300 mls. of ice water. The precipitate is filtered with suction, washed with water and dried. Yield: 23.38 grams (80 %) of N-(2,3-dihydroxy-5-carbomethoxy-benzyloxy)-phthalimide. After purification by rubbing with methanol the melting point is 189° to 191°C (with decomposition).

Step "C"

A mixture of 3.43 grams (0.01 moles) of N-(2,3-dihydroxy-5-carbomethoxy-benzyloxy)-phthalimide prepared in the previous step, 0.7 mls. (0.0105 moles) of 76.3 % hydrazine hydrate and 25 mls. of ethanol are stirred for 1 hour at room temperature, then kept boiling for 2 hours. After cooling the precipitate is filtered with suction, washed with a little ethanol, and the filtrate is evaporated in vacuo up to a temperature of 50°C. The residue is dissolved in 20 mls. of ethyl acetate with mild heating, thereafter 9.4 mls. of 16 % isopropanolic D-tartaric acid solution are added. The mixture is concentrated in vacuo up to a temperature of 50°C, and after cooling dry ether is added to the residue. The precipitate so obtained is filtered with suction, washed with ether and dried. Yield: 2.02 grams (55.6 %) of 2,3-dihydroxy-5-carbomethoxy-benzyloxyamide D-hydrogen tartrate; m.p.: 70° to 73°C (with decomposition).

What we claim is:

1. New substituted methoxy amines of the general formula I

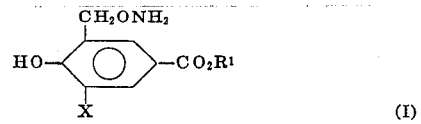

(I)

wherein $R^1$ stand for a methyl or ethyl group, and X is a hydrogen atom or an OH group, and their pharmaceutically acceptable acid addition salts.

2. 2-Hydroxy-5-carbomethoxy-benzyloxyamine.
3. 2-Hydroxy-5-carbethoxy-benzyloxyamine.
4. 2,3-Dihydroxy-5-carbomethoxy-benzyloxyamine.

* * * * *